US009667814B2

(12) United States Patent
Watariuchi

(10) Patent No.: US 9,667,814 B2
(45) Date of Patent: May 30, 2017

(54) IMAGE PROCESSING APPARATUS, METHOD OF EXECUTING A WORKFLOW, AND STORAGE MEDIUM

(75) Inventor: Satoki Watariuchi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1019 days.

(21) Appl. No.: 12/638,402

(22) Filed: Dec. 15, 2009

(65) Prior Publication Data

US 2010/0185942 A1   Jul. 22, 2010

(30) Foreign Application Priority Data

Dec. 15, 2008  (JP) .................................. 2008-318289

(51) Int. Cl.
*G06F 17/00* (2006.01)
*H04N 1/00* (2006.01)
*H04N 1/32* (2006.01)

(52) U.S. Cl.
CPC ..... *H04N 1/00222* (2013.01); *H04N 1/00225* (2013.01); *H04N 1/00244* (2013.01); *H04N 1/32625* (2013.01); *H04N 1/32657* (2013.01); *H04N 1/32128* (2013.01); *H04N 2201/0065* (2013.01); *H04N 2201/0094* (2013.01); *H04N 2201/3205* (2013.01); *H04N 2201/3208* (2013.01); *H04N 2201/3209* (2013.01); *H04N 2201/3278* (2013.01)

(58) Field of Classification Search
CPC ........................... H04N 1/00204; G06F 17/24
USPC ................. 715/248, 249, 200, 255
See application file for complete search history.

(56) References Cited

U.S. PATENT DOCUMENTS 5,848,415 A * 12/1998 Guck .......................... 707/831
5,870,089 A *  2/1999 Fabbio et al. ............... 715/733
5,911,776 A *  6/1999 Guck .......................... 709/217
(Continued)

FOREIGN PATENT DOCUMENTS

JP     2003-134294 A    5/2003
JP     2004-287860 A   10/2004
(Continued)

OTHER PUBLICATIONS

Japanese Office Action for corresponding JP 2008-318289, mail date Nov. 27, 2012.

*Primary Examiner* — Manglesh M Patel
(74) *Attorney, Agent, or Firm* — Rossi, Kimms & McDowell LLP

(57) ABSTRACT

An image processing apparatus which is capable of transmitting document data in a proper document format to an external system. An original input section inputs document data. A document data transmission section transmits the input document data to the system. A workflow execution section executes a workflow defined as a series of processes that can include a process for inputting the document data, and a process for transmitting the document data to the external system. A document format acquisition section acquires a document format of the document data required by the system, from the system. When the workflow execution section executes the workflow including the process for transmitting the document data to the external system, a document format check section judges whether or not the document data to be transmitted satisfies the acquired document format.

6 Claims, 7 Drawing Sheets

(56) References Cited

U.S. PATENT DOCUMENTS

| | | | | |
|---|---|---|---|---|
| 5,964,156 | A * | 10/1999 | Smith | B41B 21/32 101/471 |
| 6,421,733 | B1 * | 7/2002 | Tso et al. | 709/246 |
| 6,697,999 | B1 * | 2/2004 | Breuer | G06F 17/21 715/236 |
| 6,725,424 | B1 * | 4/2004 | Schwerdtfeger et al. | 715/239 |
| 7,421,650 | B2 * | 9/2008 | Zettel et al. | 715/239 |
| 7,472,083 | B2 * | 12/2008 | Schleicher | 705/35 |
| 7,519,714 | B2 * | 4/2009 | Macneil | H04L 67/12 709/227 |
| 7,542,164 | B2 * | 6/2009 | Ebner | H04N 1/00127 358/1.2 |
| 7,620,892 | B2 * | 11/2009 | Rainero | H04L 65/602 382/232 |
| 7,940,411 | B2 * | 5/2011 | Henry et al. | 358/1.15 |
| 8,078,700 | B2 * | 12/2011 | Matsubara | H04L 29/06027 709/203 |
| 8,200,759 | B2 * | 6/2012 | Capiel | 709/206 |
| 2002/0065101 | A1 * | 5/2002 | Picoult et al. | 455/556 |
| 2003/0137689 | A1 * | 7/2003 | Bontempi | G06F 3/1204 358/1.15 |
| 2005/0132264 | A1 * | 6/2005 | Joshi et al. | 715/500.1 |
| 2005/0219594 | A1 * | 10/2005 | Miyamoto | H04N 1/33307 358/1.13 |
| 2006/0059415 | A1 * | 3/2006 | Hagiuda | 715/500 |
| 2006/0241455 | A1 * | 10/2006 | Shvarts | A61B 8/08 600/447 |

FOREIGN PATENT DOCUMENTS

| | | |
|---|---|---|
| JP | 2007-310468 A | 11/2007 |
| JP | 2008-004103 A | 1/2008 |
| JP | 2008-154076 A | 7/2008 |

* cited by examiner

IMAGE PROCESSING APPARATUS, METHOD OF EXECUTING A WORKFLOW, AND STORAGE MEDIUM

BACKGROUND OF THE INVENTION

Field of the Invention

The present invention relates to an image processing apparatus configured to manage a workflow, a method of executing a workflow, and a storage medium, and more particularly to an image processing apparatus characterized by a technique for transferring a file of document data during execution of a workflow, from the apparatus to a system, such as a file server, connected to the apparatus via a network or the like, a method of executing the workflow, and a computer-readable storage medium storing a control program for causing a computer to execute the method.

Description of the Related Art

In recent years, an image processing apparatus (image forming apparatus) has a network function and hence can be connected to a network, such as a local area network. This means that the image processing apparatus can be connected to various external systems via the network.

Further, in recent years, in an image forming apparatus, convenient functions, such as a function of transmitting generated document data by e-mail or storing the document data in a data area called a box, are realized in addition to basic functions thereof, such as a copy function and a printing function.

Further, an image forming apparatus for use in office work usually separately uses individual functions, such as the above-mentioned copy function, transmission function and box storage function, but it also often uses some of the functions in combination.

For example, there is a case where a paper document is scanned to generate document data, and the document data is stored in a box and is further transmitted to persons concerned, by e-mail. Further, there is also a case where a plurality of document data items stored in the box are simultaneously and collectively printed (in a manner integrated in one document data item).

In the above cases, the user has to configure the individual functions, respectively. It is inconvenient for the user to have to configure the functions whenever he/she uses the image forming apparatus. To eliminate this inconvenience, there has been proposed an application which regards each of individual functions, such as the copy function, the transmission function and the box storage function, as one work item, and is capable of defining and executing a workflow in which an order of execution of a plurality of work items and settings for processing of the work items are set in advance.

Further, there has also been proposed a system which is capable of defining a workflow such that a process configuration screen for a desired work item is displayed during execution of the workflow (see e.g. Japanese Patent Laid-Open Publication No. 2007-310468). In the system disclosed in Japanese Patent Laid-Open Publication No. 2007-310468, during execution of the workflow, a process configuration screen for a work item is displayed and preset details of the process of the work item are temporarily changed thereon to execute the workflow.

Further, there has also been proposed a service processing apparatus configured to control not only the individual functions of the image forming apparatus but also a plurality of services such that processing of the services is executed in a cooperative manner by the functions (see e.g. Japanese Patent Laid-Open Publication No. 2004-287860).

Furthermore, there has also been proposed a technique in which during execution of the work item "transmission", an attribute information file storing attribute information associated with document data is generated by scanning and is transmitted together with the document data (see e.g. Japanese Patent Laid-Open Publication No. 2003-134294).

In this technique, an application operating on the image forming apparatus executes a workflow, and transmits document data and the attribute file to an external system. The system having received the document data and the attribute file performs some processing with reference to the document data and the attribute file. Normally, document formats of document data that can be processed by the system are predetermined.

The term "document format" is intended to mean a set of elements constituting document data, including a file format, such as PDF or TIFF, a setting of color or monochrome printing, a resolution, and the number of pages. Each document format element does not always take a single fixed value but sometimes has a plurality of candidates or a range of values. Further, it is possible to specify a document format of a document data item, on a part-by-part basis, for example, as "A4 color printing on a first sheet, and A3 monochrome printing on a second sheet".

Now, when document data in a document format different from the document format that can be processed by the system is received from the image forming apparatus, the system cannot execute associated processing normally.

For example, when color character data is input to the system in spite of the system being capable of processing only monochrome character data, or when only two pages of document data are input in spite of five pages being required, the system cannot continue processing.

Even if a workflow is defined in advance in the application that operates on the image forming apparatus such that document data in a proper document format is transmitted to the system, it sometimes occurs that the document data in the proper document format is not transmitted for one of the following reasons:

(1) In executing the workflow, the document format of the document data to be transmitted is changed because the user performs from the configuration screen an operation e.g. "to select a document from a box" or "to change scan parameters".

(2) In executing the workflow, the document format required by a system as a transmission destination is changed because the user performs an operation "to change the transmission destination".

(3) The document format required by the system is changed.

SUMMARY OF THE INVENTION

The present invention provides an image processing apparatus which is capable of transmitting document data in a proper document format to an external system, a method of executing a workflow, and a computer-readable storage medium storing a program for causing a computer to execute the method.

In a first aspect of the present invention, there is provided an image processing apparatus comprising an input unit configured to input document data, a transmission unit configured to transmit the document data input by the input unit to an external system, a workflow execution unit configured to execute a workflow which is defined as a series of processes that can include a process for inputting the document data by the input unit and a process for transmitting the document data to the external system by the transmission unit, a document format acquisition unit configured to acquire a document format of the document data required by the external system, from the external system, and a document format judgment unit configured to judge, when the series of processes include the process for transmitting the document data to the external system, whether or not the document data to be transmitted by the transmission unit satisfies the document format acquired by the document format acquisition unit.

In a second aspect of the present invention, there is provided a method of executing a workflow in an image processing apparatus, comprising inputting document data, transmitting the document data input by the inputting, executing a workflow defined as a series of processes that can include a process for inputting the document data, for the inputting, and a process for transmitting the document data to the external system, for the transmitting, acquiring a document format of the document data required by the external system, from the external system, and judging, when the series of processes include the process for transmitting the document data to the external system, whether or not the document data to be transmitted by the transmitting satisfies the document format acquired by the acquiring of the document format.

In a third aspect of the present invention, there is provided a computer-readable storage medium storing a control program for causing a computer to execute a method of executing a workflow in an image processing apparatus, wherein the method comprises inputting document data, transmitting the document data input by the inputting, executing a workflow defined as a series of processes that can include a process for inputting the document data, for the inputting, and a process for transmitting the document data to the external system, for the transmitting, acquiring a document format of the document data required by the external system, from the external system, and judging, when the series of processes include the process for transmitting the document data to the external system, whether or not the document data to be transmitted by the transmitting satisfies the document format acquired by the acquiring of the document format.

According to the present invention, it is possible to transmit document data in a proper document format to an external system.

Further features of the present invention will become apparent from the following description of exemplary embodiments (with reference to the attached drawings).

DETAILED DESCRIPTION OF THE EMBODIMENTS

The present invention will now be described in detail below with reference to the accompanying drawings showing embodiments thereof.

Figure 1:
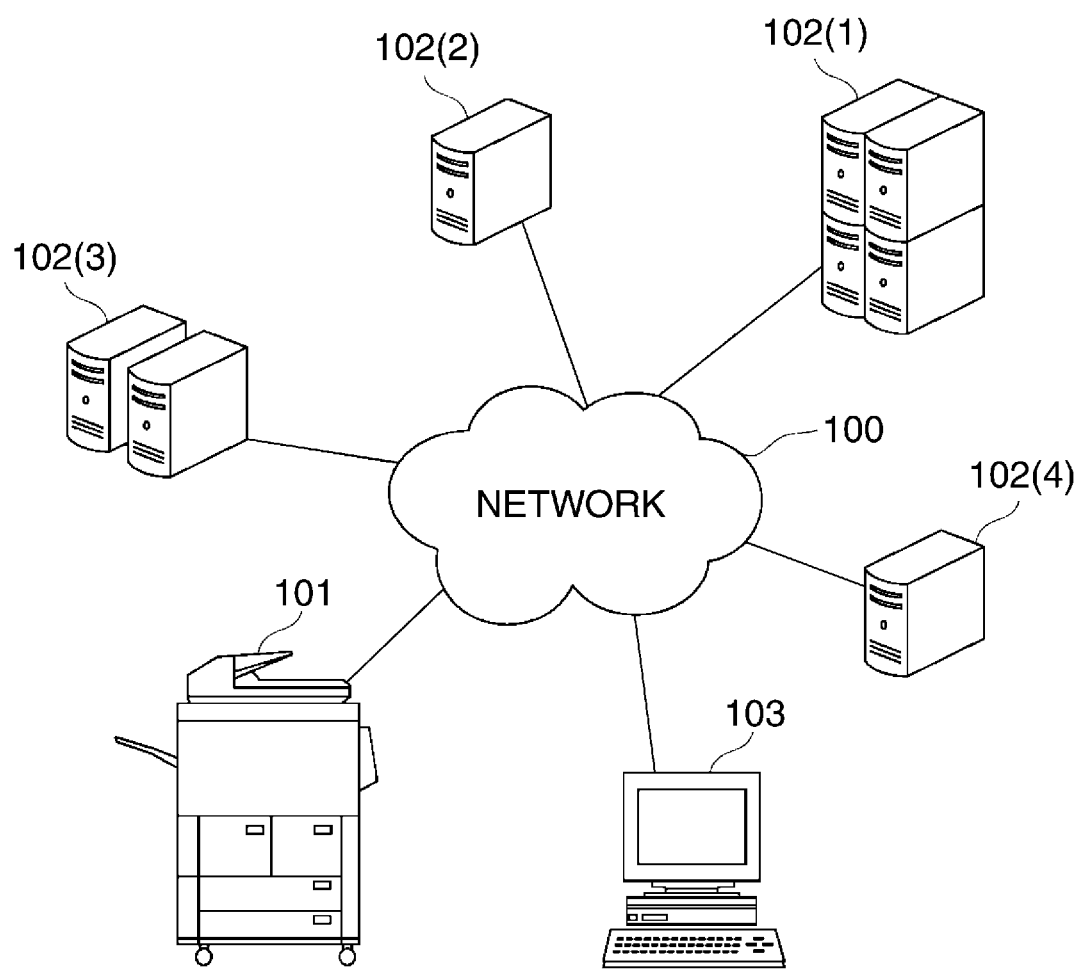
FIG. 1 is a diagram of a network system in which an image forming apparatus as an image processing apparatus according to an embodiment of the present invention is connected to various systems via a network.

FIG. 1 is a diagram of a network system in which an image forming apparatus as an image processing apparatus according to an embodiment of the present invention is connected to various systems via a network.

The image forming apparatus 101 is connected to a desired network 100, such as the Internet or an intranet. The image forming apparatus 101 as the image processing apparatus according to the present embodiment is a digital multifunction peripheral (MFP) equipped with a plurality of functions, such as a copy function, a printing function, a scanner function, a box function, a facsimile function and a network transmission/reception function. Although only one image forming apparatus 101 is shown to be connected to the network 100 in FIG. 1, a plurality of image forming apparatuses 101 may be connected to the network. Further, although in the present embodiment, the image processing apparatus is described by taking the image forming apparatus as an example, it is also possible to apply a scanner device or the like equipped with a scanner function and a facsimile function or a network transmission/reception function, to the image processing apparatus.

To the network 100 are connected not only the image forming apparatus 101 but also systems 102(1), 102(2), 102(3) and 102(4) as external systems of the image forming apparatus 101. Although only four systems are shown to be connected to the network 100 in FIG. 1, a plurality of systems the number of which is more than four may be connected to the network 100.

For simplicity of explanation, a single desired system is referred to as a "system 102(X)". Further, a single system different from the system 102(X) is referred to as a "system 102(Y)".

Now, the system 102(X) includes an SMB (Server Message Block) server, an FTP (File Transfer Protocol) server, a document management server, a database system, a business system, such as an ERP (Enterprise Resource Planning) system, which is closely related to office work, and a system that is assumed to be a business support system or the like.

Further, an information terminal 103, such as a personal computer (PC), is also connected to the network 100. Although only one information terminal 103 is shown to be connected to the network 100 in FIG. 1, a plurality of information terminals 103 may be connected to the network 100.

As described above, the image forming apparatus 101 is configured such that it can be connected to various systems 102(X) via the network 100.

Figure 2:
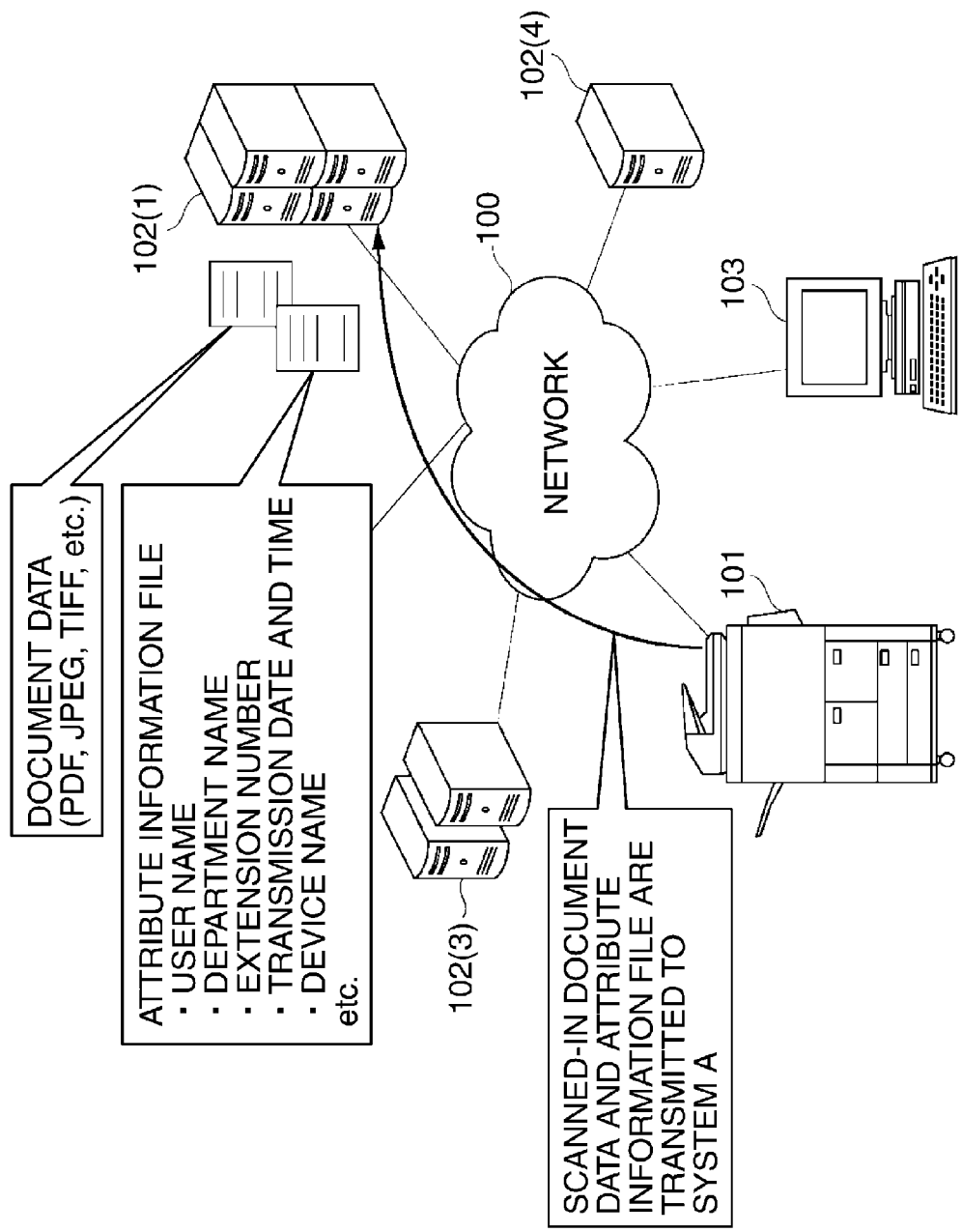
FIG. 2 is a view useful in explaining how document data generated by the image forming apparatus in FIG. 1 and an attribute information file are transmitted to an external system.

FIG. 2 is a view useful in explaining how document data generated by the image forming apparatus 101 in FIG. 1 and an attribute information file are transmitted to the system 102(X).

As shown in FIG. 2, the attribute information file, which is created and stored in the image forming apparatus 101, stores system information, such as the name and IP address of the image forming apparatus 101 that has performed scanning, or user information, such as the name of a user who has performed scanning, the name of a department to which the user belongs, and the extension number of a phone the user uses. That is, the attribute information file includes information that another system or program refers to when the system or the program performs some processing on document data generated by scanning. The system stores image data and attribute information both transmitted from the image forming apparatus 101 in a manner associated with each other. Although in the present embodiment, it is assumed that the attribute information file includes the above-mentioned information, the attribute information file may include information different from the above-mentioned information.

Figure 3:
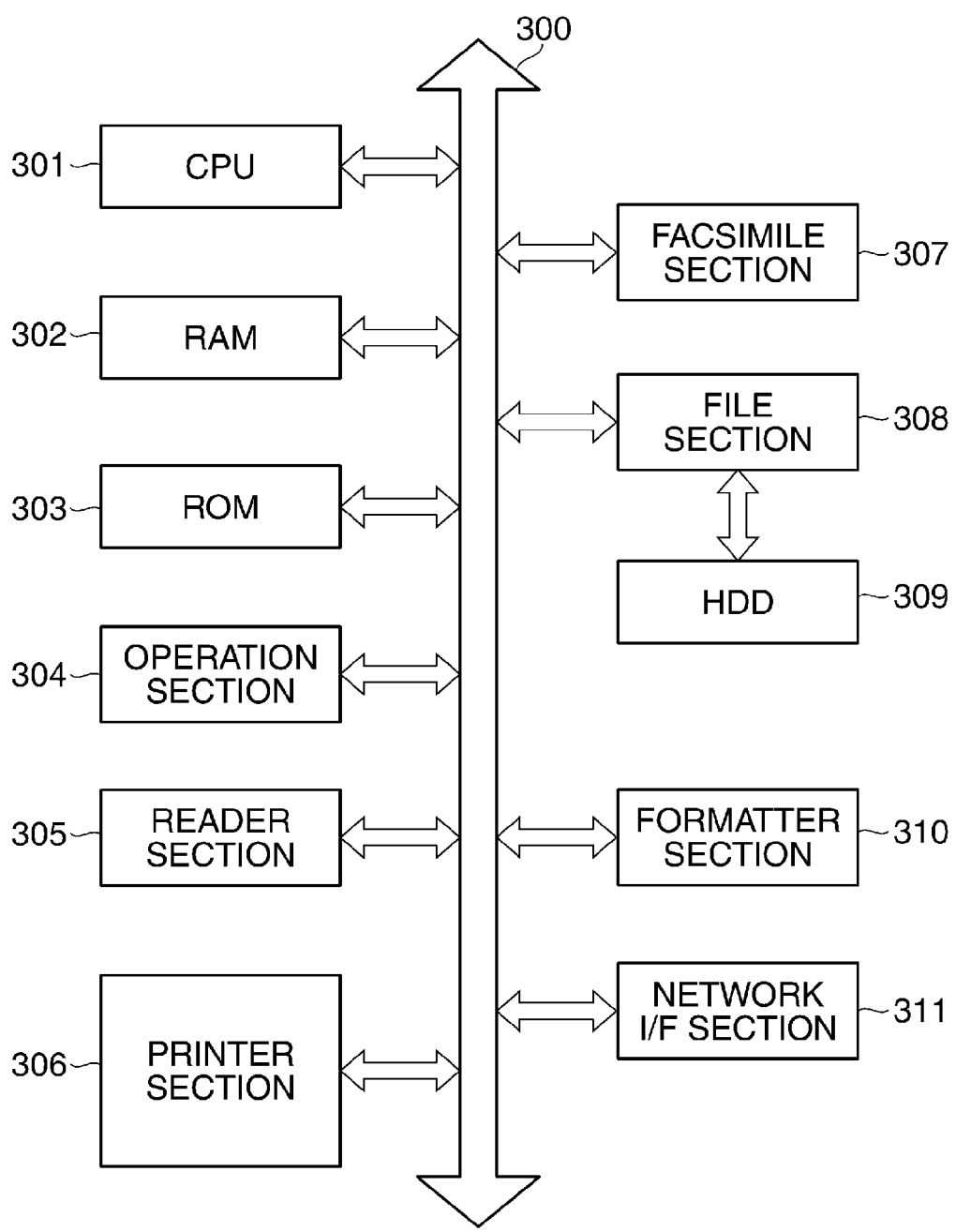
FIG. 3 is a block diagram of the image forming apparatus in FIG. 1.

FIG. 3 is a block diagram showing an example of the hardware configuration of the image forming apparatus 101 in FIG. 1.

Referring to FIG. 3, a transfer bus (address bus, data bus, input/output bus and control bus) 300 connects between the following component elements 301 to 311.

The CPU 301 responsible for computation and control of the image processing apparatus 101 executes programs for managing the states of the respective component elements of the image forming apparatus 101 and controlling inputs and outputs of commands and image data items.

The RAM 302 is a main memory of the CPU 301 and serves as work areas and data areas of the programs.

The ROM 303 is a memory storing a procedure of an operation process executed by the CPU 301. The ROM 303 records (stores) an operating system (OS), which is a system program for controlling the devices of the image forming apparatus 101, and data, such as information required for operating the system.

The operation section (operation panel) 304 gives a print (copy or print) instruction to the reader section 305, described hereinafter, and instructions of processing to the component elements 306 to 311 electrically connected to the reader section 305. The operation section 304 includes a display section for displaying an operation screen, and buttons and keys for receiving operation inputs by a user. The display section may be formed by a liquid crystal display section or the like or by a liquid crystal display section having a touch panel sheet affixed thereto.

The reader section 305, which is an image input device for converting an original into image data, reads (scans) an image of each sheet of the original e.g. by a CCD linear image sensor, converts the image into digital image data, and outputs the digital image data.

The printer section 306 is an image output device which includes a plurality of types of recording sheet cassettes and outputs image data from the reader section 305 as visible images on recording sheets in response to a print instruction input via the operation section 304. The facsimile section 307 controls the facsimile function.

The file section 308 controls the function of a file system for managing files stored in a HDD (Hard Disk Drive) 309. Further, the HDD 309 may store programs to be executed by the CPU 301. The HDD 309 is provided with data areas each called a box for storage of document data. The HDD 309 may be replaced by an SSD (Solid State Drive) using a flash memory. The formatter section 310 performs various kinds of image processing for visualizing image data information. The network interface (I/F) section 311 is connected to the network 100, for performing communication processing.

By using the component elements shown in FIG. 3, the image forming apparatus 101 realizes functions of copying, e-mail transmission, inputting and outputting document data to and from the box, etc. Further, when executing the above-mentioned functions, the image forming apparatus 101 displays screens for configuring various settings of color/monochrome printing, a print magnification, double-sided/single-sided printing, and so forth, on the operation section 304. It is necessary for the user to configure settings, as required, on an associated one of the configuration screens.

Figure 4:
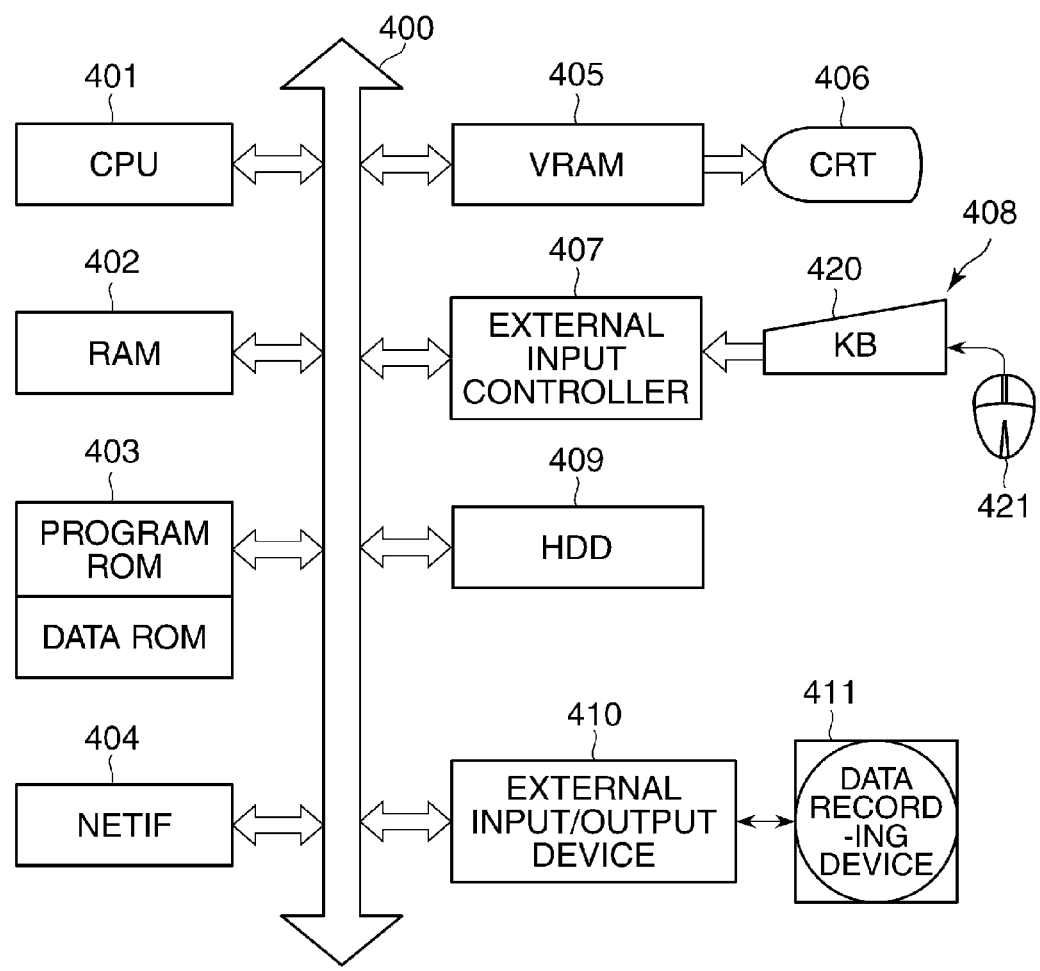
FIG. 4 is a block diagram of an information processing apparatus used as each of the systems and an information terminal appearing in FIG. 1.

FIG. 4 is a block diagram of an information processing apparatus used as each of the system 102(X) and the information terminal 103 appearing in FIG. 1.

As shown in FIG. 4, a transfer bus (address bus, data bus, input/output bus and control bus) 400 connects between the following component elements 401 to 410.

The CPU 401 is responsible for computation and control of the image processing apparatus 101.

The RAM 402 is a main memory of the CPU 401 and serves as work areas and data areas of a program being executed.

The ROM 403 is a memory storing a procedure of an operation process executed by the CPU 401. The ROM 403 includes a program ROM storing an operating system (OS), which is a system program for controlling the devices of the image processing apparatus, and a data ROM for storing data, such as information required for operating the system. The programs may be stored in an HDD (Hard Disk Drive) 409, referred to hereinafter.

A network interface (NETIF) 404 controls data transfer to/from information processing apparatuses via the network 100 and checks the connection state for this data transfer.

The video RAM (VRAM) 405 loads an image to be displayed on a screen, referred to hereinafter, of the display device (CRT) 406 that displays an operating state of the information processing apparatus, and controls the display of the image.

An external input controller 407 is for controlling an input signal from an external input device 408.

The external input device 408 is for accepting an operation by the user. The external input device 408 is comprised of a keyboard 420 and a pointing device 421, such as a mouse.

The HDD 409 is used for storing application programs and various kinds of data. The application programs in the present embodiment are software programs for executing various processes in the present embodiment, and so forth.

The external input/output device 410 includes a floppy (registered trademark) disk drive, a CD-ROM drive, and a like device which has a data recording device 411 inserted therein or removed therefrom, and is used for reading any of the aforementioned application programs from the data recording device 411.

The data recording device 411 is a removable medium from which data is read by the external input/output device 410, such as a magnetic recording medium, an optical recording medium, a magnetic-optical recording medium, or a semiconductor recording medium. As the magnetic recording medium, there may be mentioned e.g. a floppy (registered trademark) disk. As the optical recording medium, there may be mentioned e.g. a CD-ROM. As the magnetic-optical recording medium, there may be mentioned e.g. an MO. As the semiconductor recording medium, there may be mentioned e.g. a memory card. The external input/output device 410 and the data recording device 411 may be implemented by an external hard disk drive and a hard disk contained therein.

The application programs and data stored in the HDD 409 can be stored in the data recording device 411 for use.

Figures 5, 6:
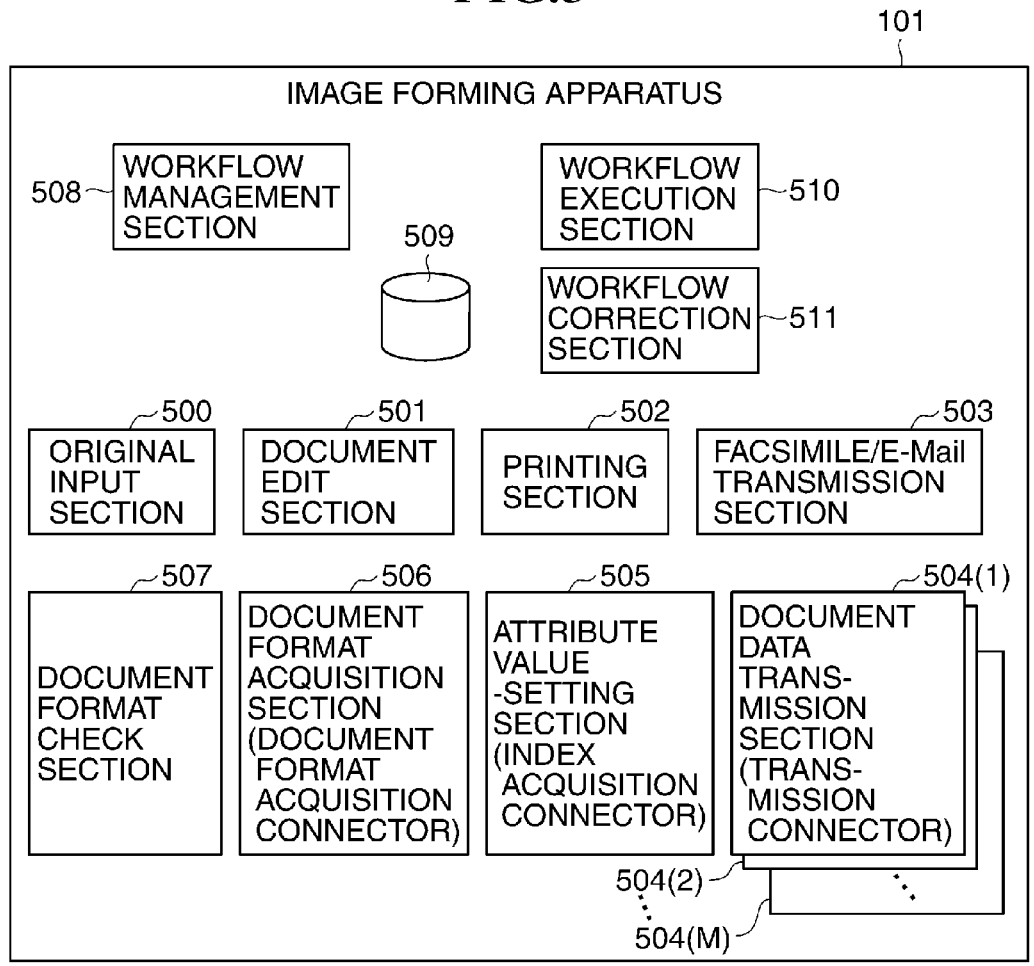
FIG. 5 is a block diagram of functional modules of the image forming apparatus in FIG. 1.
FIG. 6 is a view of a data structure used in a document format check section in FIG. 5.

FIG. 5 is a block diagram of an example of functional modules of the image forming apparatus 101 in FIG. 1.

In FIG. 5, the modules correspond to programs executed by the image forming apparatus 101, and are stored in the HDD 309 or the ROM 303 of the image forming apparatus 101. The programs of the modules are loaded on the RAM 302, and are executed by the CPU 301. Further, in FIG. 5, database is stored in the HDD 309 of the image forming apparatus 101.

An original input section 500 is executed by the CPU 301 of the image forming apparatus 101. To prepare document data, the original input section 500 instructs the reader section 305 to scan a paper document, or reads document data scanned-in and stored in advance, from a data area i.e. a box of the HDD 309 to another data area.

In the present embodiment, image data obtained by scanning paper documents and image data obtained by loading PDL data are referred to as document data. Further, data files generated by application programs, such as word-processing software and spreadsheet software, and image data obtained by converting such data files are also referred to as document data.

The image forming apparatus 101 is also capable of having document data input therein by receiving a data file generated by an application program, as mentioned above, from the information terminal 103 or the like via the network, and storing the data file in the box of the HDD 309.

A document edit section 501 is executed by the CPU 301 of the image forming apparatus 101. The document edit section 501 edits document data acquired by the original input section 500 and document data stored in the HDD 309 e.g. by deleting pages of the document data or combining the document data with other document data. The editing process may include other processing on image data, such as resolution conversion, rotation, color/monochrome conversion, and format conversion thereof. Further, the document edit section 501 instructs the file section 308 via the transfer bus 300 to store the edited document data in a data area i.e. a box of the HDD 309.

A printing section 502 is executed by the CPU 301 of the image forming apparatus 101. The printing section 502 instructs the printer section 306 via the transfer bus 300 to print document data acquired by the original input section 500 or document data edited by the document edit section 501, as a paper document.

A facsimile/e-mail transmission section 503 is executed by the CPU 301 of the image forming apparatus 101. The facsimile/e-mail transmission section 503 transmits the document data acquired by the original input section 500 or the document data edited by the document edit section 501 to a designated transmission destination. A method of transmitting document data from the facsimile/e-mail transmission section 503 to the transmission destination includes facsimile transmission and e-mail transmission conforming to communication protocols, such as SMB (Server Message Block) protocol, FTP (File Transfer Protocol) and SMTP (Simple Mail Transfer Protocol).

Document data transmission sections (transmission connectors) 504(1), 504(2), . . . , 504(M) are each executed by the CPU 301 of the image forming apparatus 101. The document data transmission sections 504(1), 504(2), . . . , 504(M) each transmit the document data processed by the original input section 500 or the document edit section 501 to an associated one of the systems 102(1), 102(2), . . . , 102(M). The communication protocols used by the document data transmission sections 504(1) to 504(M) for transmitting document data to the associated systems include the facsimile protocol, the e-mail protocol, the FTP and the SMB protocol.

The document data transmission section 504(X) is a means for transmitting document data to a certain desired system 102(X), and there are provided, respective different means for transmitting document data to the system 102(X) and to the system 102(Y).

The reason for providing different means for the respective systems is that the system 102(X) and the system 102(Y) are different from each other in communication protocol, procedure, and required parameters, for data transmission and reception. When document data is transmitted to the system 102(X) together with an attribute information file attached thereto, the attribute information file is generated by the document data transmission section 504(X).

An attribute value-setting section (index acquisition connector) 505 is executed by the CPU 301 of the image forming apparatus 101. The attribute value-setting section 505 sets attributes value as attribute information required by the document data transmission section 504(X), which are defined in a work item "transmission" of a workflow, described hereinafter.

It is assumed that the attribute values set by the attribute value-setting section 505 can be referred to by the document data transmission section 504(X). When setting the attribute values, the attribute value-setting section 505 acquires data managed by a database system or a file server to which the attribute value-setting section 505 can be connected via the network 100.

The system to which the attribute value-setting section 505 is connected to this end may be the same as or different from the system 102(X) to which the document data transmission section 504(X) is connected.

A document format acquisition section (document format acquisition connector) 506 is executed by the CPU 301 of the image forming apparatus 101. The document format acquisition section 506 acquires the document format of document data required by the system 102(X) with which the document data transmission section 504(X) cooperates, from data managed by a database system or a file server to which document format acquisition section 506 can be connected via the network 100.

The system to which the document format acquisition section 506 is connected to this end may be the same as or different from the system 102(X) to which the document data transmission section 504(X) is connected. Similarly, the system to which the document format acquisition section 506 is connected may be the same as or different from the system 102(X) to which the attribute value-setting section 505(X) is connected.

If the system to which the document format acquisition section 506 is connected is the same as the system to which the attribute value-setting section 505(X) is connected, the image forming apparatus 101 may be configured such that the attribute value-setting section 505 simultaneously acquires the attribute values and the document format. In this case, the attribute value-setting section 505 also serves as the document format acquisition section 506.

Here, the term "document format" is intended to mean a set of elements constituting document data, including a file format, such as PDF or TIFF, a setting of color or monochrome printing, a resolution, and the number of pages. Each document format element does not always take a single fixed value but sometimes has a plurality of candidates or a range of values. Further, it is possible to specify a document format of a document data item, on a part-by-part basis, for example, as "A4 color printing on a first sheet, and A3 monochrome printing on a second sheet".

A document format check section 507 is executed by the CPU 301 of the image forming apparatus 101. The document format check section 507 determines whether or not document data to be transmitted by the document data transmission section 504(X) satisfies the document format acquired by the document format acquisition section 506.

A workflow management section 508 is executed by the CPU 301 of the image forming apparatus 101. The workflow is a definition of a flow of works in which while regarding each of individual functions equipped in the image forming apparatus 101, such as a scanning function, an e-mail transmission function, and a box storage function, as one work item, an order of execution of a plurality of work items and settings for processing of the work items are registered in advance, so as to thereby execute them as a sequence of processes.

In the present embodiment, it is assumed that the details of processing defined by the workflow is described in the XML. In the present embodiment, the workflow can be roughly divided into a process (input process) for inputting image data, a process (editing process) for editing the image data, and a process (output process) for outputting the image data. The details of processing may be formed only by the input process and the output process depending on the workflow. The workflow management section 508 registers and manages, as a workflow, a flow of works in which a preset order of execution of a plurality of work items and preset settings for processing of the sequence of the work items. Therefore, the work items represent the functions of the image forming apparatus 101 realized by the original input section 500, the document edit section 501, the printing section 502, etc., respectively.

A workflow management DB (Database) 509 stores a workflow defined by the workflow management section 508.

A workflow execution section 510 reads out and executes the workflow stored in the workflow management DB 509.

A workflow correction section 511 corrects processing parameters of each work item of the workflow during execution of the workflow started by the workflow execution section 510. When it is determined by the document format check section 507 that any processing parameter(s) of a work item does not satisfy the document format, the workflow correction section 511 corrects the processing parameter(s) of the work item such that the processing parameters of the work item satisfy the document format.

FIG. 6 is a view showing an example of a data structure indicative of a document format used in the document format check section 507 in FIG. 5.

Data 600 is acquired from the system 102(X) by the document format acquisition section 506, and is stored in the RAM 302 or the HDD 309. Although the contents of the data 600 are represented by character strings for ease of understanding of the data structure, they may be represented by symbols or numerical values.

An item 601 specifies the number of sheets (pages) of the document data to be transmitted by the document data transmission section 504(X). As shown in FIG. 6, a fixed value may be specified as the number, or a range of numbers of sheets, e.g. "not less than n", "not more than n" or "n to m" may be specified. Further, if there is no limitation to the number of sheets of document data to be transmitted by the document data transmission section 504(X), the number of sheets may be specified as "not specified".

An item 602 specifies the size of sheets of an original (original size) of document data to be transmitted by the document data transmission section 504(X). As the size of sheets, a fixed value may be specified e.g. as "A4", or the size of a sheet may be specified on a page-by-page basis in such a manner as "A4 for 1st page and A3 for 2nd and 3rd pages".

Further, the size of each sheet of may be specified as one selectable from a plurality of sizes, e.g. as "one of A4, A5 and A6". Further, instead of specifying one(s) of standard sizes, such as "A4" and "letter", there may be specified the vertical and horizontal sizes of each sheet. It should be noted that the original size 602 indicates the size of each page of image data to be transmitted to the system, which is determined according to the size of each corresponding sheet of the original scanned by the reader section 305 and a magnification applied when the original is scanned in by the reader section 305. If there is no limitation to the size of sheets of document data to be transmitted by the document data transmission section 504(X), the original size 602 may be specified as "not specified".

An item 603 specifies a color mode of document data to be transmitted by the document data transmission section 504(X). The settings of the color mode include "color", "monochrome" and "not specified". In specifying the color mode, a fixed value of e.g. "color" may be used, or the color mode may be specified on a page-by-page basis e.g. as "color for 1st page" and monochrome for 2nd and following pages". Further, if there is no limitation to the color mode of document data to be transmitted by the document data transmission section 504(X), the color mode may be specified as "not specified".

An item 604 specifies the resolution of document data to be transmitted by the document data transmission section 504(X). As the resolution, a fixed value of e.g. "600×600 dpi" may be specified, or a lower limit value or an upper limit value may be specified e.g. as "not lower than 200×200 dpi" or "not higher than 300×300 dpi".

Further, the resolution may be specified as one selectable from a plurality of resolutions e.g. as "one of 100×100 dpi, 150×150 dpi and 200×200 dpi". Furthermore, if there is no limitation to the resolution of document data to be transmitted by the document data transmission section 504(X), the resolution may be specified as "not specified".

An item 605 specifies the file format of document data to be transmitted by the document data transmission section 504(X). As the file format, a fixed value of "PDF" may be specified, or the file format may be specified as one selectable from a plurality of file formats, e.g. as "one of TIFF, PDF and JPEG". Furthermore, if there is no limitation to the file format of document data to be transmitted by the document data transmission section 504(X), the file format may be specified as "not specified.

Figure 7A:
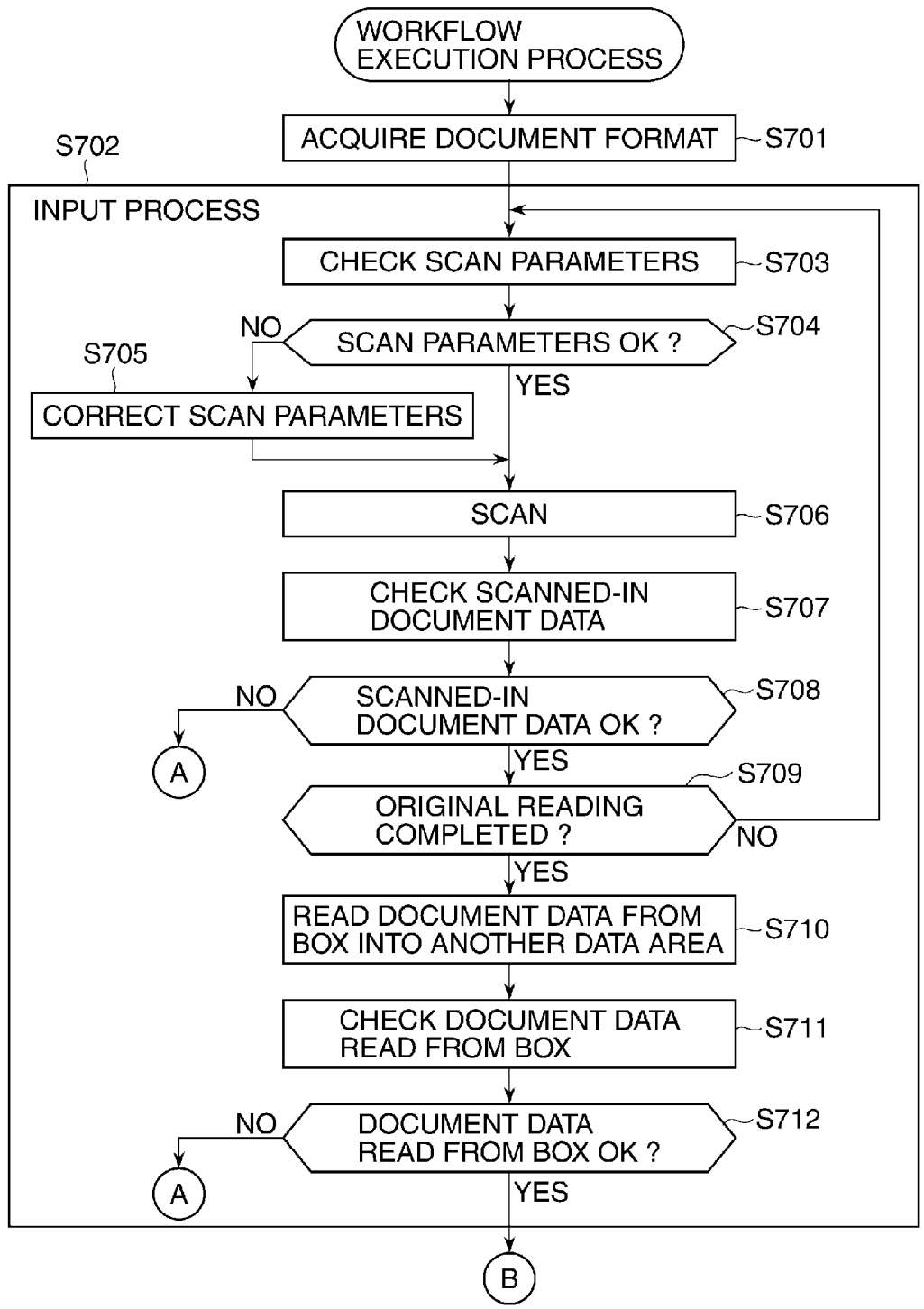
FIG. 7A is a flowchart of a workflow execution process executed by the image forming apparatus.
Figure 7B:
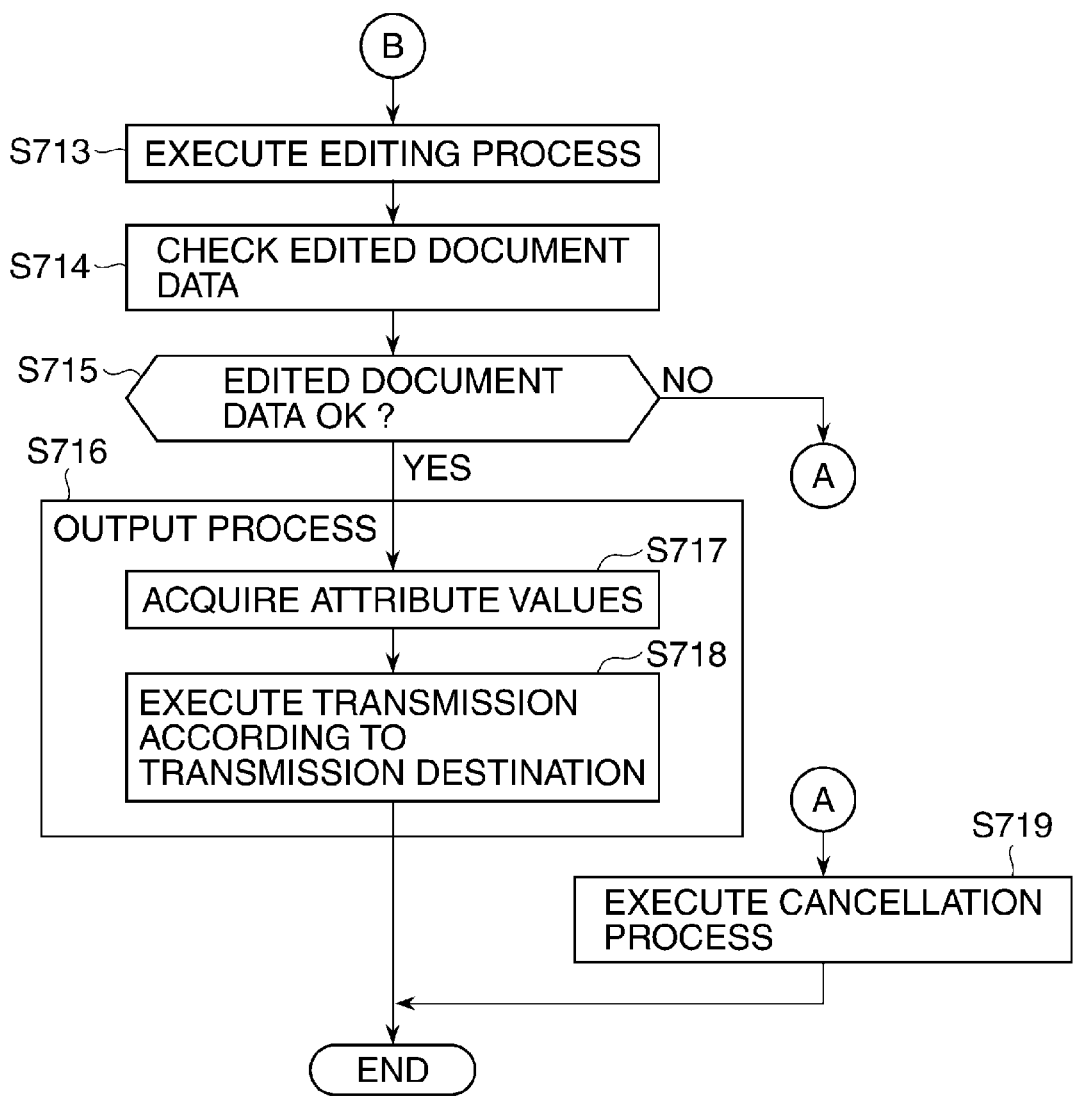
FIG. 7B is a continuation of FIG. 7A.

FIGS. 7A and 7B are a flowchart of a workflow execution process executed by the image forming apparatus appearing in FIGS. 3 and 5.

A program for the workflow execution process is stored in the HDD 309 or the ROM 303 of the image forming apparatus 101, and is loaded into the RAM 302 so as to be executed by the CPU 301.

In a step S701, in response to a user operation, such as depression of a workflow execution button on the operation section 304, the workflow execution section 510 starts a workflow designated by the user, and executes a process for acquiring a document format. The workflow execution section 510 calls the document format acquisition section 506 defined in the workflow.

The document format acquisition section 506 refers to a data file in the file server on the network 100 based on the SMB protocol, and acquires document format data. The document format acquisition section 506 stores the acquired document format data in the RAM 302 or the HDD 309.

Although in the description of the flowchart in FIGS. 7A and 7B, a system to which the document format acquisition section 506 is connected is an SMB server, this is not limitative, but the system to which the document format acquisition section 506 is connected may be a database system or server other than the SMB server.

Further, when the document format acquisition section 506 also serves as the attribute value-setting section 505, in the step S701, necessary attribute value data may be acquired simultaneously with acquisition of the document format data.

In a step S702 (steps S703 to S712), the workflow execution section 510 executes work items defined in the input process of the workflow in operation. In the present embodiment, it is assumed by way of example that work items "scan" and "box input" are defined in the input process of the workflow.

Further, although in the present embodiment, the work items are processes in the order of "scan" and "box input", the work items may be processes in the order of "box input" and "scan", or they may be processed in parallel.

Here, the "scan" is defined as causing the original input section 500 to instruct the reader section 305 to perform an original reading process for reading an original (paper document) via the transfer bus 300. Further, the "box input" is defined as causing the original input section 500 to read document data, which has been scanned in advance, from a data area i.e. a box of the HDD 309, to another data area of the RAM 302 or the HDD 309.

In the step S703, the workflow execution section 510 calls the document format check (document format determination) section 507. In the step S703, the document format check section 507 executes the following processing:

First, the document format check section 507 checks whether or not scan parameters to be used in a step S706, referred to hereinafter, satisfy the document format acquired in the step S701. The scan parameters indicate original reading parameters for use in scanning an original, such as "color selection", "resolution", "original reading size", "magnification", or "number of pages (i.e. number of sheets of an original)". At this time, the document format check section 507 reads all the information on the work items defined in the workflow before checking the document format, and checks a page number i.e. on what number sheet the work item "scan", i.e. the reading process is about to be executed, in the step S706, referred to hereinafter.

Next, the document format check section 507 checks whether or not the scan parameters to be used in the step S706 satisfy a document format specified for the page. For example, if work items "scan", "box input (for inputting 4-page document data)", "document combining (for combining a box document and a scanned-in document in the mentioned order)", and "page deletion (for deleting second and third pages)" are defined, it means that in the step S706, the original reading process is to be carried out on the third and following pages.

To do this, the document format check section 507 checks whether or not the scan parameters to be used in the step S706 satisfy a document format specified for the third and following pages.

However, if in the workflow, a setting of "open a configuration screen during execution" is defined for a specific work item, it is sometimes impossible to determine what number page is to be scanned in the step S706.

For example, if the work item "page deletion" has the setting of "open a configuration screen during execution" set therefor, what number page of the document data is actually to be deleted cannot be finally determined before a step S713 (for executing an editing process), referred to hereinafter, is completed. Only after the user has configured the parameters on the configuration screen in the step S713, it is finally determined what number page(s) of the document data is/are to be deleted. If the page(s) to be deleted is/are changed, the page numbers of the document data are also changed, so that it is not finally determined in the step S703 on what number page of the document data is to be scanned in the step S706.

If it is thus impossible to determine in the step S703 as to what number page of the document data is to be scanned in the step S706, the document format check section 507 does not check a document format specified for a specific page.

However, even in such a case, if there is an item of a document format specified for the whole document data, the document format check section 507 checks whether or not the scan parameters of the item to be used in the step S706 satisfy the document format.

In the step S704, the workflow execution section 510 confirms the result of the check in the step S703. If the result of the check in the step S703 shows that the scan parameters to be used in the step S706 satisfy the specified document format, the workflow execution section 510 proceeds to the step S706.

If it is determined in the step S704 that the scan parameters to be used in the step S706 do not satisfy the specified document format, the workflow execution section 510 proceeds to the step S705.

In the step S705, the workflow execution section 510 calls the workflow correction section 511. The workflow correction section 511 corrects the scan parameters defined for the work item "scan" such that the scan parameters satisfy the document format acquired in the step S701.

At this time, the workflow correction section 511 may display a message notifying the correction of the scan parameters on the operation section 304 to notify the user of the fact. Further, if no correction value is unconditionally determined because of any item of the document format specifying a range or a plurality of values, the workflow correction section 511 may display a scan configuration screen which enables the user to select only scan parameter values satisfying the document format, on the operation section 304, to thereby prompt the user to correct the scan parameters.

In the step S706, the workflow execution section 510 calls the original input section 500. The original input section 500 performs the original reading process using the scan parameters defined for the work item "scan" or the scan parameters corrected in the step S705.

In the step S707, the workflow execution section 510 calls the document format check section 507. In the step S707, the workflow execution section 510 carries out the following processing:

First, the document format check section 507 checks whether or not the document data read in the step S706 satisfies the document format acquired in the step S701. At this time, the document format check section 507 reads all the information on the work items defined in the workflow before checking the document format, and checks what number page of document data as an output of the whole workflow the document data read in the step S706 corresponds to.

Next, the document format check section 507 checks whether or not the document data read in the step S706 satisfies a document format specified for the corresponding page. For example, let us consider a case in which the work items "scan", "box input (for inputting 4-page document data)", "document combining (for combining a box document and a scanned-in document in the mentioned order)", and "page deletion (for deleting second and third pages)" are defined.

Under the above conditions, when two pages of the original are read in the step S706, it is understood that the document data read in the step S706, i.e. document data read by the work item "scan" is data of the third and fourth pages. Therefore, the document format check section 507 checks whether or not the document data read in the step S706 satisfies a document format specified for the third and fourth pages.

However, if the workflow contains a specific work item having the setting of "open a configuration screen during execution" set therefor, it is sometimes impossible to finally determine what number page the document data read in the step 706 corresponds to. For example, if the work item "page deletion" has the setting of "open a configuration screen during execution" set therefor, what number page of the document data is actually to be deleted cannot be finally determined before the step S713 (for executing the editing process), referred to hereinafter, is completed.

Only after the user has configured the parameters on the configuration screen in the step S713, it is finally determined what number page(s) of the document data is/are to be deleted. If the page(s) to be deleted is/are changed, the page numbers of the document data are also changed, so that it is not finally determined in the step S707 what number page the document data read in the step S706 corresponds to.

As described above, if it is impossible in the step S707 to determine what number page the document data read in the step S706 corresponds to, the document format check section 507 does not check a document format specified for a specific page. However, even in such a case, if there is an item of a document format specified for the whole document data, the document format check section 507 checks whether or not the document data read in the step S706 satisfies the document format.

The document format check section 507 checks the document data in the step S707 in spite of the check having been made on the scan parameters in the step S703, because there is a case where the document format check section 507 cannot check the document data using the scan parameters.

For example, in the step S706, when an ADF (Auto Document Feeder) is used to read a plurality of sheets of an original, there is a possibility that the number of the sheets of the original to be read exceeds the number of sheets specified by the document format. Further, when the scan parameters used in the step S706 includes "original reading size=auto", the reading size of the original is not finally determined until the original is actually read in the step S706. Since these problems cannot be checked by the scan parameters in the step S703, it is necessary to check the document data actually read by the original input section 500 in the step S707.

Further, when only "scan" is defined as a work item of the input process and the editing process of the workflow, the document data read in the step S706 directly becomes document data to be transmitted by the document data transmission section 504(X) in a step S718, referred to hereinafter. In this case, the check of the document format of the document data in the step S707 directly servers as the check of the document data to be transmitted.

In the step S708, the workflow execution section 510 confirms the result of the check in the step S707. If the result of the check in the step S707 shows that the document data read in the step S706 satisfies the specified document format, the workflow execution section 510 proceeds to the step S709.

If it is not determined in the step S708 that the document data read in the step S706 does not satisfy the designated document format, the workflow execution section 510 proceeds to a step S719.

In the step S709, the workflow execution section 510 determines whether or not the work item "scan" is completed. The workflow execution section 510 performs the determination of the completion of the work item "scan" based on the definition of the workflow and a user's instruction.

If the work item "scan" in the workflow has a setting of "continuous original reading" defined therefor, it means that the user can perform the original reading process a plurality of times by changing scan parameters.

Therefore, when the work item "scan" in the workflow has the setting of "continuous original reading" defined therefor, the workflow execution section 510 displays a screen for prompting the user to confirm whether or not the "scan" process is continued, on the operation section 304, in the step S709.

The workflow execution section 510 checks a user's instruction, and determines whether or not the work item "scan" is completed. Further, when the work item "scan" in the workflow does not have the setting of "continuous original reading" defined therefor, the workflow execution section 510 determines that the work item "scan" has been completed, without displaying the confirmation screen.

If the work item "scan" has been completed, the workflow execution section 510 proceeds to the step S710. If the work item "scan" has not been completed, the workflow execution section 510 returns to the step S703.

In the step S710, the workflow execution section 510 calls the original input section 500. The original input section 500 reads data from the box using the setting defined by the work item "box input".

In the step S711, the workflow execution section 510 calls the document format check section 507. The document format check section 507 checks whether or not the document data read in the step S710 satisfies the document format acquired in the step S701.

At this time, the document format check section 507 reads all the information on the work items defined in the workflow before checking the document format, and checks what number page the document data as an output of the whole workflow read in the step S710 corresponds to.

Next, the document format check section 507 checks whether or not the document data read in the step S710 satisfies a document format specified for the corresponding page.

For example, let us consider a case in which the work items "scan", "box input (for inputting 4-page document data)", "document combining (for combining a box document and a scanned-in document in the mentioned order)", and "page deletion (for deleting second and third pages)" are defined. Under these conditions, it is understood that the document data read in the step S710, i.e. according to the work item "box input", corresponds to the first and second pages of the document data as an output of the whole workflow.

Therefore, the document format check section 507 checks whether or not the document data read in the step S710 satisfies a document format specified for the first and second pages.

Further, if only "box input" is defined as a work item of the input process and the editing process of the workflow, the document data read in the step S710 directly becomes document data to be transmitted by the document data transmission section 504(X) in the step S718, referred to hereinafter. In this case, the check of the document format of the document data in the step S711 directly serves as the check of the document data to be transmitted.

In the step S712, the workflow execution section 510 confirms the result of the check in the step S711. If the result of the check in the step S711 shows the document data read in the step S710 satisfies the specified document format, the workflow execution section 510 proceeds to the step S713.

If it is determined in the step S712 that the document data read in the step S710 does not satisfy the designated document format, the workflow execution section 510 proceeds to the step S719. The process up to the step S712 corresponds to the input process.

In the step S713, the workflow execution section 510 calls the document edit section 501, and executes the work item defined for the editing process of the workflow in operation. The document edit section 501 performs processes, such as "document combining", "page deletion", and so forth, using the document data generated in the input process of the workflow, and stores the resulting document data in the RAM 302 or the HDD 309.

In a step S714, the workflow execution section 510 calls the document format check section 507. The document format check section 507 checks whether or not the document data edited in the step S713 satisfies the document format acquired in the step S701.

The reason for checking the document data in the step S714 in spite of the document data having been checked in the steps S707 and S711 as an editing source is that there is a case where the document data cannot be checked before execution of the editing process in the step S713.

As described above in the steps S707 and S711, if the workflow has the setting of "open a configuration screen during execution" defined for a specific work item, the contents of the final document data is not finally determined until the work item is executed. After execution of the editing process in the step S713, the final document data is finally determined, and hence it is possible to check all the document formats acquired in the step S701.

That is, the check of the document format of the document data in the step S714 is a final check of the document data to be transmitted by the document data transmission section 504(X) in the step S718, referred to hereinafter.

In the step S715, the workflow execution section 510 confirms the result of the check in the step S714. If the result of the check in the step S714 shows the document data edited in the step S713 satisfies the specified document format, the workflow execution section 510 proceeds to a step S716.

On the other hand, if it is determined in the step S715 that the document data edited in the step S713 does not satisfy the specified document format, the workflow execution section 510 proceeds to the step S719.

In the step S716 (steps S717 and S718), the workflow execution section 510 executes a work item defined for the output process of the workflow in operation. In the present embodiment, it is assumed that the work item "transmission" is executed in the output process, and at the same time the document data transmission section 504(X) is defined in the work item "transmission". Further, in the step S716, another work item, such as "print", may be defined in the workflow.

In the step S716, when another other work item, such as "print", is defined in the workflow, the workflow execution section 510 calls the printing section 502 or the like according to the definition.

In the step S717 of the output process of the step S716, the workflow execution section 510 calls the attribute value-setting section 505. The attribute value-setting section 505 refers to a data file on the network file server based on the SMB protocol, and acquires necessary attribute value data. The attribute value-setting section 505 stores the acquired attribute value data in the RAM 302 or the HDD 309.

Although in the present embodiment, the system to which is connected the attribute value-setting section 505 is the SMB server, this is not limitative, but the system to which is connected the attribute value-setting section 505 may be a database system or a server, such as a document management server, other than the SMB server.

Further, when the document format acquisition section 506 also serves as the attribute value-setting section 505, in the step S701, necessary attribute value data is acquired simultaneously with acquisition of the document format, which makes it possible to dispense with the process in the step S717.

In the step S718 of the output process in the step S716, the workflow execution section 510 calls the document data transmission section 504(X) defined in the work item "transmission" in the output process of the started workflow.

The document data transmission section 504(X) called by the workflow execution section 510 generates an attribute information file from the attribute value data acquired in the step S717, and transmits the attribute information file to the system 102(X) together with the document data edited in the step S713, followed by terminating the present process.

In the step S719, the workflow execution section 510 executes a cancellation process for cancelling the workflow in operation, and terminates the present process. At this time, the workflow execution section 510 may display an item or items of the checked document format, which has/have not been satisfied, and the reason why it/they have not been satisfied.

As described above, before document data is transmitted to the system 102(X), it is possible to detect that the document data to be transmitted does not satisfy a document format required by the system 102(X).

Further, even if a workflow is erroneously defined or an erroneous parameter is set on a configuration screen during execution of a workflow, the user can recognize the error during execution of the workflow. This makes it possible to change the definition of the workflow or the parameter(s) in situ to thereby transmit document data in a proper document format.

Further, a document format is dynamically acquired from a system cooperating with the system 102(X) during execution of the workflow, and therefore even if the document format required by the system 102(X) is changed, it is possible to check a new document format without changing the workflow.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-318289, filed Dec. 15, 2008 which is hereby incorporated by reference herein in its entirety.

What is claimed is:

1. An image processing apparatus comprising:
    an image input device configured to generate document data by scanning a paper document; and
    a processor configured to execute a workflow that includes:
        a document scanning task that causes the image input device to generate document data by scanning a paper document according to scan parameters
        a transmission task that transmits the document data generated by said document scanning task to an external server system;
        a document format information acquisition task that acquires document format information that represents a format of the document data required by the external server system, from the external server system;
        a scan parameter judgment task that judges whether or not the scan parameters used for scanning the paper document by the image input device satisfy the document format information acquired by said document format acquisition task; and
        a correction task that corrects, when said scan parameter judgment task judges that the scan parameters do not satisfy the document format information, the scan parameters so that the corrected scan parameters satisfy the document format information acquired by said document format acquisition task,
    wherein said document format information acquisition task, said scan parameters judgment task, and said correction task are executed before both of said document scanning task and said transmission task.

2. The image processing apparatus according to claim 1, wherein the workflow further includes a document format judgment task that judges whether or not the format of the document data generated by said document scanning task satisfies the document format information.

3. The image processing apparatus according to claim 2, wherein the workflow further includes:
    an editing task that edits the document data generated by said document scanning task,
    wherein said document format judgment task judges whether or not the format of the document data edited by said editing task satisfies the document format information.

4. The image processing apparatus according to claim 2, wherein the workflow further includes a workflow cancellation task that cancels execution of the workflow when said document format judgment task judges that the format of the document data does not satisfy the document format information.

5. A workflow method of executing a workflow in an image processing apparatus, the workflow method comprising the steps of:
    scanning a paper document using an image input device to generate document data by scanning a paper document according to scan parameters;
    transmitting the document data generated in the scanning step to an external server system;
    acquiring document format information that represents a format of the document data required by the external server system, from the external server system;
    judging whether or not the scan parameters used for scanning the paper document by the image input device satisfy the document format information acquired in the acquiring step; and
    correcting, when the judging step judges that the scan parameters do not satisfy the document format information, the scan parameters so that the corrected scan parameters satisfy the document format information acquired in the acquiring step,
    wherein the acquiring step, the judging step, and the correcting steps are executed before both of the scanning step and the transmitting step.

6. A non-transitory computer-readable storage medium storing a control program executable by a computer to execute a workflow method of executing a workflow in an image processing apparatus, wherein the workflow method comprises the steps of:
    scanning a paper document using an image input device to generate document data by scanning a paper document according to scan parameters;
    transmitting the document data generated in the scanning step to an external server system;
    acquiring document format information that represents a format of the document data required by the external server system, from the external server system;
    judging whether or not the scan parameters used for scanning the paper document by the image input device satisfy the document format information acquired in the acquiring step; and
    correcting, when the judging step judges that the scan parameters do not satisfy the document format information, the scan parameters so that the corrected scan parameters satisfy the document format information acquired in the acquiring step,
    wherein the acquiring step, the judging step, and the correcting steps are executed before both of the scanning step and the transmitting step.

* * * * *